UNITED STATES PATENT OFFICE.

ARTHUR EICHENGRÜN AND THEODOR BECKER, OF ELBERFELD, GERMANY, ASSIGNORS TO FARBENFABRIKEN OF ELBERFELD CO., OF NEW YORK, N. Y., A CORPORATION OF NEW YORK.

CELLULOSE ACETATE.

No. 809,935.     Specification of Letters Patent.     Patented Jan. 16, 1906.

Application filed February 20, 1903. Serial No. 144,338. (Specimens.)

*To all whom it may concern:*

Be it known that we, ARTHUR EICHENGRÜN and THEODOR BECKER, doctors of philosophy, chemists, residing at Elberfeld, Germany, (assignors to the FARBENFABRIKEN OF ELBERFELD CO., of New York,) have invented a new and useful Improvement in Cellulose Acetate; and we hereby declare the following to be a clear and exact description of our invention.

In the specification of our application for Letters Patent, Serial No. 88,898, filed the 8th of January, 1902, we have described a new acetylized derivative of cellulose, being a triacetyl cellulose, which we prepare by treating cellulose with acetic anhydrid and sulfuric acid. In the further course of experiments we have found that this reaction takes place in two phases. At first an acetate is produced which is soluble in alcohol, this product being then transformed by the further action of acetic anhydrid and sulfuric acid into the above-mentioned triacetyl cellulose insoluble in alcohol. We have now succeeded in carrying out the action of acetic anhydrid and sulfuric acid on cellulose in such a way as the above-mentioned acetate, soluble in alcohol, is prepared as chief product. For this purpose we stop the process when the body soluble in alcohol at first produced begins to be transformed into the triacetyl cellulose insoluble in alcohol.

In carrying out this process practically we can proceed as follows, the parts being by weight: A mixture of eighty parts of acetic anhydrid, eighty parts of glacial acetic acid, four parts of concentrated sulfuric acid, and twenty parts of cellulose (*e. g.*, cotton-yarn) is allowed to stand at from 20° to 25° centigrade, with stirring from time to time. After about ten hours the whole mass is transformed into a thick syrup. When the precipitate obtained by diluting a test portion with water contains only a small quantity of unchanged particles of cellulose and is still soluble in hot alcohol, the production of the new cellulose acetate is completed. The reaction mass is then mixed with a large quantity of water by stirring, and the precipitate thus obtained is filtered off and pressed. The new body thus obtained is solid and can take various forms, according to the way in which it is prepared. In a wet state it is a whitish voluminous mass. When dry, it represents yellowish hard lumps. It can also be obtained in transparent sheets and films by evaporation of its solutions. It is soluble in a seventy per cent. hot alcohol, the alcoholic solution solidifying to a gelatinous mass on cooling. By the addition of much water to the alcoholic solution the new cellulose ester is precipitated in fine light flakes.

Having now described our invention and in what manner the same is to be performed, what we claim as new, and desire to secure by Letters Patent, is—

The herein-described new cellulose acetate, characterized by being a derivative of cellulose, being soluble in hot alcohol of seventy per cent. and being produced by treating cellulose with a mixture of acetic anhydrid and sulfuric acid which is in a wet state a whitish voluminous mass and represents when dry yellowish hard lumps, the acetate being precipitated therefrom by the addition of much water in the shape of fine light flakes; the alcoholic solution solidifying in the cold to a gelatinous mass and being capable of forming transparent flexible sheets and films by evaporation of its solutions, substantially as hereinbefore described.

In testimony whereof we have signed our names in the presence of two subscribing witnesses.

ARTHUR EICHENGRÜN.
            THEODOR BECKER.

Witnesses:
   OTTO KÖNIG,
   J. A. RITTERSHAUS.